United States Patent [19]

Voegtlin

[11] Patent Number: 4,785,151

[45] Date of Patent: Nov. 15, 1988

[54] SWIVEL-TRUCK BAKERY OVEN

[76] Inventor: René Voegtlin, 2, rue de la Colline, Oberhausbergen, 67200 Strasbourg (Bas-Rhin), France

[21] Appl. No.: 8,174

[22] Filed: Jan. 29, 1987

[30] Foreign Application Priority Data

Feb. 5, 1986 [FR] France .................. 86 01666

[51] Int. Cl.$^4$ .................. H05B 3/62; A21B 1/24
[52] U.S. Cl. .................. 219/400; 126/21 A; 219/401; 219/389
[58] Field of Search .......... 219/400, 401, 385, 386, 219/387, 389, 388; 126/21 A, 21 R, 41 A; 432/142

[56] References Cited

U.S. PATENT DOCUMENTS

| | | | |
|---|---|---|---|
| 3,537,405 | 11/1970 | Verhoeven | 219/400 |
| 4,285,391 | 8/1981 | Bourner | 219/387 |
| 4,336,443 | 6/1982 | Benedetto | 219/386 |
| 4,515,143 | 5/1985 | Jabas | 219/400 |
| 4,643,163 | 2/1987 | Martinez | 432/142 |
| 4,660,540 | 4/1987 | Schröder | 219/400 |

FOREIGN PATENT DOCUMENTS

| | | | |
|---|---|---|---|
| 1432916 | 4/1969 | Fed. Rep. of Germany | 432/142 |
| 1800800 | 6/1969 | Fed. Rep. of Germany | 432/142 |
| 2422186 | 11/1975 | Fed. Rep. of Germany | 126/21 A |
| 2847963 | 5/1979 | Fed. Rep. of Germany | 219/401 |

Primary Examiner—H. Broome
Assistant Examiner—Teresa J. Walberg
Attorney, Agent, or Firm—Sandler & Greemblum

[57] ABSTRACT

A swivel-truck bakery oven having a baking chamber, a charging door, an electric control box, a recirculation channel, a re-circulation fan, heating elements for heating the re-circulation air, mechanical and power equipment for rotatably driving the swivel truck, and a blowing manifold with vertical louvres and a steam generator. The oven consists primarily of a generally rectangular frame structure, with the frame structure having a central core of parallelipipedic configuration with a width substantially corresponding to the width of the charging door, which is determined, in turn, by the width of the swivel truck. The frame structure also has a pair of detachable lateral covers which each have an interior recess or cavity of a depth that is slightly greater than half the difference between the width and the diagonal length of the swivel truck.

21 Claims, 5 Drawing Sheets

SWIVEL-TRUCK BAKERY OVEN

FIELD OF THE INVENTION

The present invention relates to a swivel-truck bakery oven for making all kinds of bread, as well as pastry, cakes and the like, which comprises a baking chamber closed by a charging door, an electric control box, a re-circulation channel provided with a re-circulation fan and means for heating the air from the baking chamber, mechanical and power means for rotating the swivel truck, a blowing manifold with vertical louvres and a steam generator.

THE PRIOR ART

In the present state of the art, swivel-truck bakery ovens for baking bread, pastry, cakes and the like are already known, which comprise a heating chamber closed by a charging door, an electric control box, a re-circulation channel provided with a re-circulation fan and a heating battery, mechanical and power means for rotating the swivel truck, a blowing manifold with its vertical louvres and a steam generator.

In these known ovens an open truck, consisting substantially of a rolling ladder assembly supporting a plurality of trays disposed at different levels in superposed relationship for carrying the products to be baked, is adapted to be introduced in and/or removed from the oven.

The truck introduced into the bakery oven is either caused to roll on a platform to which a rotational motion is imparted, this platform being either substantially level with the floor of the baking chamber, or attached to a hook also driven for rotation and suspended from the ceiling of the baking chamber.

In these known bakery ovens, the products are baked by constantly injecting streams of hot air through vertical louvres provided for this purpose in one of the walls of the baking chamber, this air flowing horizontally through the truck between the plates while the truck proper is caused to rotate slowly about is vertical axis. The air having heated the products is exhausted by the re-circulation fan opposite the blowing louvres. Thus, a particularly regular baking of the products is obtained throughout the rectangular surface of each tray, independently of their shape and/or the height available between the superposed trays.

However, this type of oven is attended by various inconveniences. In fact, this particular kind of swivel-truck oven must compulsorily have relatively large outer dimensions, with a width of the order of two to three times the truck width. In fact, since the truck is introduced in a direction perpendicular to its width, that is, with one of its minor sides first, it must be able to rotate in the baking chamber. Thus, the swivel truck generates a cylindrical volume of a diameter corresponding to the diagonal of the truck as seen in plane view and it is necessary that this cylindrical volume can be inscribed in the baking chamber.

On the other hand, the outer casing of these swivel-truck bakery ovens has conventionally a rectangular parallelipipedic configuration having its bottom in constant contact with the floor on a rectangular area mostly of substantially square configuration. This traditional construction is attended by many inconveniences on the one hand when delivering the oven and discharging this cumbersome oven from a truck platform and on the other hand when installing the oven in the bakehouse.

In fact, this structure prevents the use of a fork lift truck which is the most usual and widespread handling means. Apparently, the solution would be to deliver the oven on a pallet, but then the difficult problem of depalletizing the oven, which is relatively tall and heavy, would arise. In addition, this depalletizing operation would have to be carried out inside premises comprising in nearly all cases a step, so that the oven would have to be lifted by the height of this step where the tackle or even the crane of a road transport truck would be inoperative.

Should local conditions permit of sliding the oven horizontally while remaining at the same level when the oven is introduced into the baking room, its great width would prevent its passage through the door opening leading into this room, notably in the particular case of a conventional single-leaf door of normal width.

To avoid these inconveniences of landing the swivel-truck bakery oven from the platform of a delivery truck, introducing the oven into the bakehouse and fitting it in position in the baker room, it is customary to deliver the oven in bulk, in the form of separate component elements which are erected and assembled on the site. Now this operation is not only time-wasting and expensive, but also a loss of money for the baker notably when an old oven must be replaced by a swivel-truck oven.

It is the primary object of the present invention to avoid these various inconveniences.

SUMMARY OF THE INVENTION

The swivel-truck bakery oven according to the present invention, which is intended for baking all kinds of bread, pastry, cakes and the like and comprises a baking chamber closed by a charging door, an electric control box, a re-circulation fan and means for heating the air from the baking chamber, mechanical and power means for rotating the truck, a blowing manifold with vertical louvres and a steam generator, is characterised in that it further comprises a frame structure of a width consistent with the diameter of the cylindrical volume generated by the swivel truck, said frame structure comprising a central core of rectangular parallelipipedic configuration and of a width corresponding to that of the charging door which is subordinate to the truck width, and a pair of detachable lateral covers provided with a cavity of a depth slightly greater than one-half of the difference between the width and the diagonal of the swivel truck having a rectangular surface area.

According to another feature characterising the present invention, said central core of substantially rectangular parallelipipedic configuration comprises a floor bearing on the ground and forming a relatively narrow rectangle of which the minor sides is reduced to the width of the charging door.

In a preferred form of embodiment, the central core comprises, above the ceiling of the baking chamber, a horizontal casing for housing the electric control box, the re-circulation channel with the re-circulation fan and the heating battery, as well as the mechanical and power means for rotatably driving the swivel truck.

In the same preferred form of embodiment the central core comprises a vertical body disposed at the rear end of the floor and containing the blowing manifold with its vertical louvres for blowing hot air streams, and the steam generator.

A main advantage resulting from these specific features lies in the fact that the bakery oven can be assembled completely at the works, thus reducing very considerably the time necessary for putting the oven in actual service, and consequently the idle period of the bakehouse. In fact, the narrow central core encloses all the means and apparatus necessary for properly operating the swivel-truck bakery oven and furthermore it is only necessary to remove the two lateral covers for cleaning the opening of a single-leaf door of standard width that leads into the bakehouse.

The operating equipment is so designed and arranged that it fits perfectly either relatively narrow central core while defining a volume corresponding to the space necessary for the parallelipiped defined by the truck in its charging position. The volume thus provided for the truck is open at the front and on both lateral sides.

An advantageous form of embodiment of the present invention is obtained by providing a free space constituting a ground clearance at the base or bottom of the detachable lateral covers.

Another advantageous feature of the invention is that the complete bakery oven can be handled by using a standard fork-lift truck, without resorting to pallets, thus avoiding the difficult depalletizing step.

DESCRIPTION OF THE PREFERRED EMBODIMENT

Referring to the various Figures of the drawings, the swivel-truck bakery oven 1 according to the present invention for baking bread of all kinds, pastry and similar products comprises essentially a frame structure 3 consisting of a central core 4, a charging door 5 and two detachable lateral covers 6, 7. As a rule, the swivel truck 2 has a rectangular configuration when seen in plane view from above.

The central core 45 has a rectangular parallelipipedic configuration and a bottom plate 8 constituting the floor of the oven. This floor 8 also of rectangular shape constitutes the base member of the frame structure of the bakery oven 1. According to a specific feature of the present invention, the width 9 of this floor 8 extends at right angles to the direction in which the swivel truck 2 is charged whereas the length 10 corresponds to the depth of the bakery oven 1. This floor 8 comprises a top surface 11 constituting the inner floor surface of the oven 1 and a bottom surface 12 contacting the floor of the bakehouse, and preferably a suitable insulating material 13 is disposed between the bottom plate 8 and the ground.

Anchored to the floor 8 constituting the base plate of the central core 4 are on the one hand a pair of vertical standards 14, 15 disposed at the front corners 16, 17 of floor 8 and on the other hand a vertical body 18 of a width 19 identical with the width 9 of floor 8, this vertical body 18 being disposed at the rear end 20 of said floor 8. The standards 14, 15 and the vertical body 18 support an elongated horizontal casing 21.

Thus, a rectangular front aperture 22 and two rectangular lateral apertures 23, 24 are obtained. The front face 25 of floor 8, the front face 26 of horizontal casing 21 and the front faces 27, 28 of standards 14, 15 constitute the door-casing of the rectangular front apertures 22. This aperture 22 is closed by the charging door 5 of which the inner face 29 is provided with a peripheral gasket 30 adapted to seal the joint between this face 29 and the door casing.

The side faces 31, 32 of floor 8, the side faces 33, 34 of horizontal casing 21, the side walls 35, 36 of vertical body 18 and the lateral faces 37, 38 of standards 14, 15 constitute the frames of the rectangular lateral apertures 23, 24 normally closed by the detachable lateral covers 6,7. These covers 6, 7 are provided with a peripheral frame 39, 40 of which the inner faces 41, 42 are provided with a peripheral gasket 43, 44 for sealing the joint between this frame and the rectangular lateral apertures 23, 24.

The width 9 of floor 8 corresponds to the width 45 of the charging door 5, the width 45 of this door 5 being subordinate to the width 46 of the swivel truck 2. This swivel truck 2, which is introduced into the oven through the rectangular front aperture 22, is a skeleton truck constituting a rolling ladder supporting trays 47, 48, 49 adapted to be loaded with the products to be baked, for example loaves 50, 51, 52 . . .

In the form of embodiment illustrated, the swivel truck 2 when pushed into the baking chamber 53, is pushed automatically toward a hook 54 disposed in the upper portion of this chamber. During the baking cycle, the swivel truck 2 is rotated at a relatively low speed of coupling the hook 54 to the lower end of a vertical shaft 56 extending through the bottom wall 57 of the elongated horizontal casing 21 and driven by a motor and reduction gear unit 58 housed in said casing 21. This bottom wall 57 constitutes at the same time the ceiling of the baking chamber 53.

The horizontal casing 21 constituting the upper portion of the central core 4 of the bakery oven 1 encloses not only the vertical shaft 56 and the motor and reduction gear unit 58 driving the swivel truck 2 through said shaft 56, but also a re-circulation channel 59 and the heat-insulating material 60 associated therewith, a re-circulation fan 61 of which the turbine 62 is driven by a motor 63, means 64 for heating the air from the baking chamber 53, which comprise a battery of parallel pipes 65, 66, 67 . . . , and an electric control box 68 for operating the motor and reduction gear unit 58, the turbine motor 63 and a burner 69 connected via a fire-tube 70 to said horizontal casing 1. An intake port 71 is formed in the bottom wall of horizontal casing 21 to enable the re-circulation fan 61 to suck in air from the underlying baking chamber 53.

The vertical body 18, open at its top 72 registering with an aperture 73 formed in the bottom wall 57 of the horizontal casing 21, constitutes the rear portion of the central core 4 of bakery oven 1. This vertical body 18 encloses a manifold 74 for blowing hot air, together with its heat-insulating material 75 and a steam generator 76 rigidly secured to the inner wall 77 of vertical body 18, this inner wall 77 constituting at the same time the bottom of the baking chamber 53. A pair of vertical blowing louvres 78, 79 are formed on either side of the steam generator 76, so that, as a consequence of the particular construction of this generator, the hot air introduced into the baking chamber 53 can only flow through the vertical blowing louvres 78, 79.

The steam generator 76 has any suitable and known internal structure. It encloses pre-heated surfaces for the re-circulation hot-air circuit. To generate steam, these heated surfaces are sprinkled with water after the swivel truck 2 has been introduced into the oven.

Thus, the central core 4 incorporates all the apparatus necessary for operating the bakery oven 1 according to the instant invention. Therefore, it is possible under these conditions to assemble at the works the central core 4 with all the necessary apparatus.

During its rotation, the swivel truck 2 generates a cylindrical volume 80 having a diameter 81 equal to the diagonal 82 of the rectangular horizontal cross-section of swivel truck 2. As a result, two cylindrical sectors 83, 84 project on either side of central core 4 through the lateral apertures 23, 24. Thus, these two cylindrical sectors 83, 84 must necessarily be accomodated in the detachable lateral covers 6, 7. For this purpose, the lateral covers 6, 7 comprise a cavity 85, 86 having a depth 87 slightly greater than half the difference between the width 46 and the diagonal 82 of swivel truck 2.

According to a first form of embodiment, this cavity 86, 86 is a parallelipiped. However, this shape is attended by a loss of baking volume between the cylindrical volume 80 generated by the swivel truck 2 and the parallelipipedic cavities 85, 86.

According to a second and preferred form of embodiment, each cavity 85, 86 has the shape of a cylindrical sector corresponding to the cylindrical sectors 83, 84 of the cylindrical volume 80 generated by the swivel truck 2.

However, the swivel truck 2 cannot penetrate into these cavities 85, 86 unless the bottom surface 88, 89 of each cavity 85, 86 is at a level slightly lower than the rectangular base 90 of swivel truck 2.

Thus, in case it were necessary to slide the bakery oven 1 through the relatively narrow dormant frame of a single-leaf standard door, it is possible to reduce the width of the bakery oven 1 to the width of the central core 4 corresponding to the width 9 of its floor 8 by simply removing and then re-fitting the detachable lateral covers 6, 7, fixed by rows of standard bolts 91 - 94 to the central core 4, these bolts being accessible from inside the baking chamber 53.

It is an essential object of the present invention to provide a bakery oven 1 so designed that it can be either unloaded from the platform of a delivery truck by using a conventional fork lift truck, and/or rolled by means of a pallet puller to its final site of normal operation. For this purpose, the detachable lateral covers 6, 7 comprise at their bottom 97, 98 a free space 99 constituting a ground clearance. This free space permits of inserting the forks either of a lift truck or of a pallet puller.

According to a first form of embodiment, this free space 99 is obtained by forming suitable openings in the lower portions 97, 98 of lateral covers 6, 7.

Figure 1:
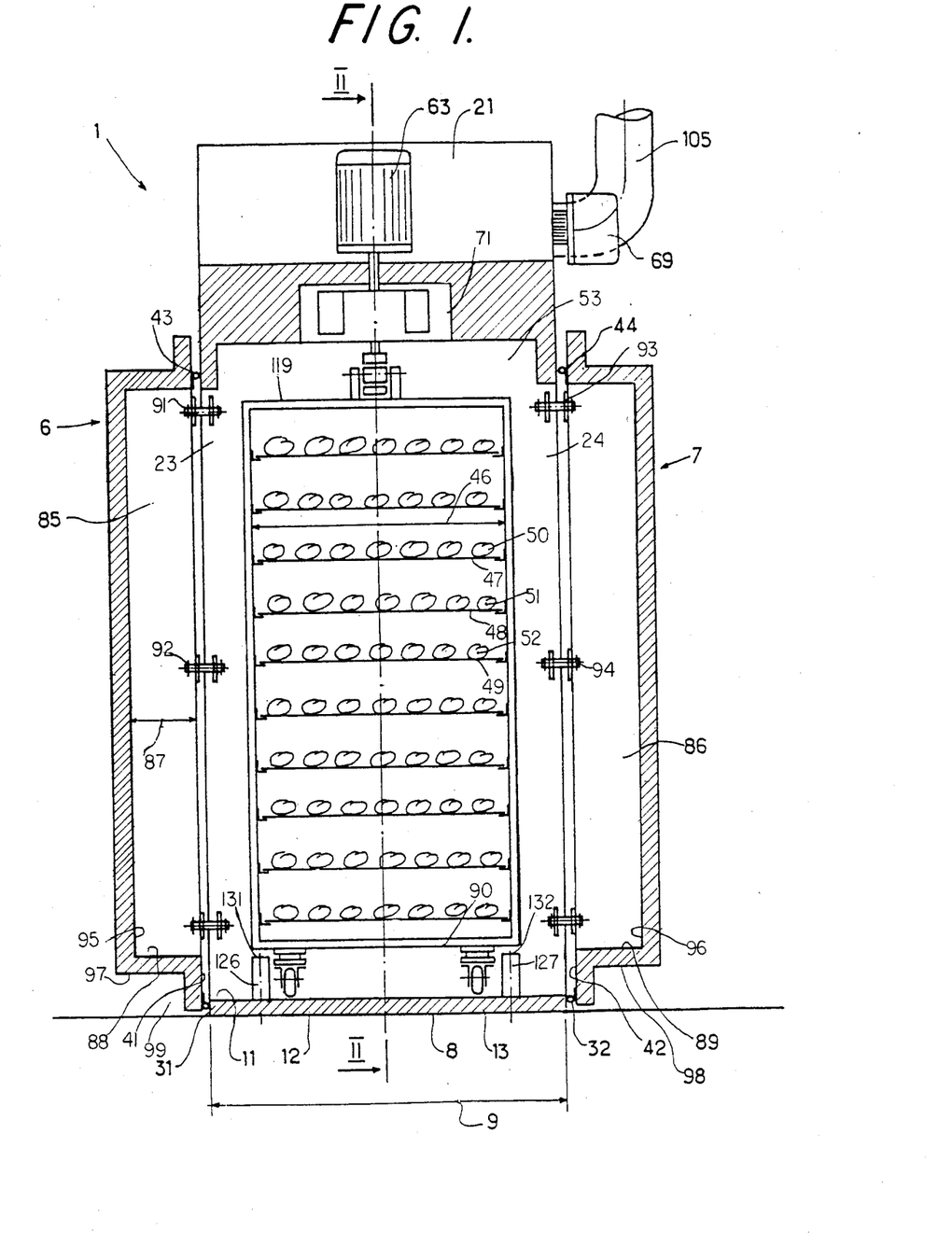
FIG. 1 is a part-elevational, part-sectional view of the swivel-truck bakery oven of the present invention, the section being taken along the line I—I of FIG. 2.
Figure 2:
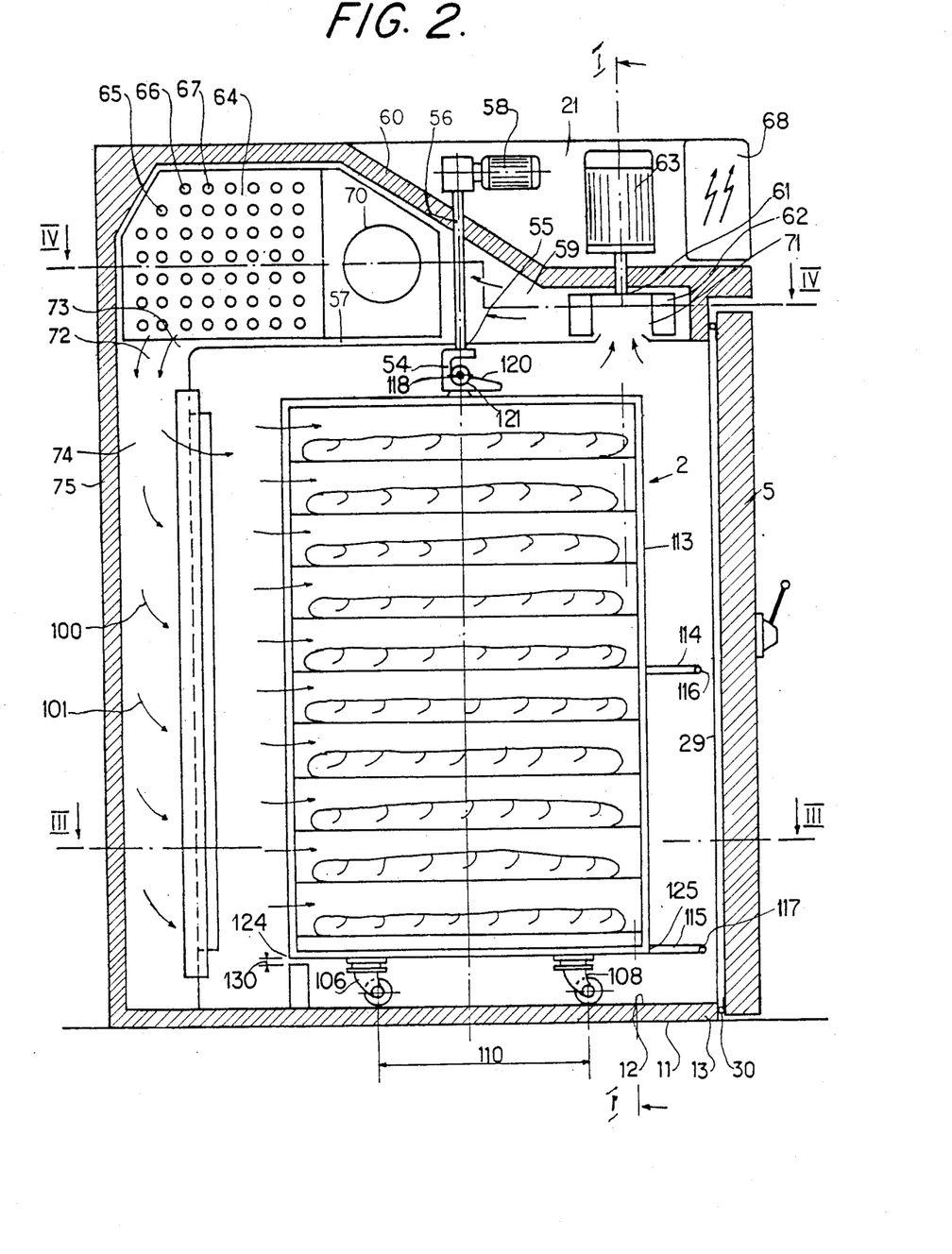
FIG. 2 is a side elevational and part-sectional view of the same bakery oven, the section being taken along the line II—II of FIG. 1.

According to a modified form of embodiment shown notably in FIG. 1, the lower portions 97, 98 are somewhat raised with respect to the peripheral frames 39, 40, so that these frames have likewise a sufficient ground clearance.

Under these conditions, the baking chamber 53 is limited at the front by the inner wall 29 of charging door 5, at the rear by the inner wall 77 of vertical body 18, laterally by the inner surfaces 95, 96 of cavities 85, 86 of the detachable lateral covers 6, 7, at its bottom by the upper wall 11 of ceiling 8 and at its top by the lower wall 57 of horizontal casing 21.

When the swivel-truck 2 has been properly loaded it the baking chamber 53 and water has been sprinkled into the steam generator 76, the necessary baking heat is provided by the hot air streams shown diagrammatically in the drawings in the form of arrows 100, 101 blown through the vertical louvres 78, 79 of blowing manifold 74. After flowing through the swivel truck 2 between the trays 47, 48, 49 so as to contact the products 50, 51, 52 . . . to be baked, the air streams having lost part of their heat are sucked through the intake port 71 by the turbine 62 of re-circulation fan 61 and forced through the heating battery 64, and again towards the blowing manifold 74, and so forth.

According to a first form of embodiment, the heating means 64 consist of a heat exchanger for liquid or gaseous fuel designed to fit in the rear portion 102 of the horizontal casing 21 of central core 4. From the burner 69, the combustion gas follows a substantially horizontal path through the fire tube 70 and flows into a manifold box 103 which deflects the gas in the opposite direction through the tubes 65, 66, 67 . . . leading to another manifold box 104, and is eventually discharged in the atmosphere through an exhaust or chimney-stalk 105.

The air streams produced by the re-circulation fan 61 are forced in a direction across the fire tube 70 and also around the tubes 65, 66, 67 . . . which heat the re-circulation air, the heat exchange surfaces of manifolds 103, 104 also assisting in this heat exchange.

With this particular arrangement all the above-described heat-exchange elements play an efficient part without constituting undesired protrusions with respect to the parallelipedic volume of the central core 4 of the bakery oven of the present invention.

In another possible form of embodiment of the present invention the heating means 64 may consist of any suitable cluster of electric resistances, which are basically free of any particular difficulty as far as their incorporation in the frame structure of the central core 4 is concerned.

The handling of the swivel truck 2 is facilitated by the provision of four casters 106, 107, 108 and 109. As a rule, these casters are disposed as the four corners of the rectangular base of the truck. However, considering the particular configuration of the frame structure 3 of the bakery oven 1, the swivel truck 2 is specially designed for adapting the truck to this frame structure 3. For this purpose, the four casters 106, 107, 108 and 109 are disposed somewhat closer to one another, this applying notably to their wheelbase 110, so that they are inscribed in an evolution circle 111 of a diameter 112 slightly smaller than the width 9 of the floor 8 of central core 4. Thus, the casters 106, 107, 108 and 109 cannot run against the peripheral frames 39, 40 of the detachable lateral covers 6, 7.

Figure 3:
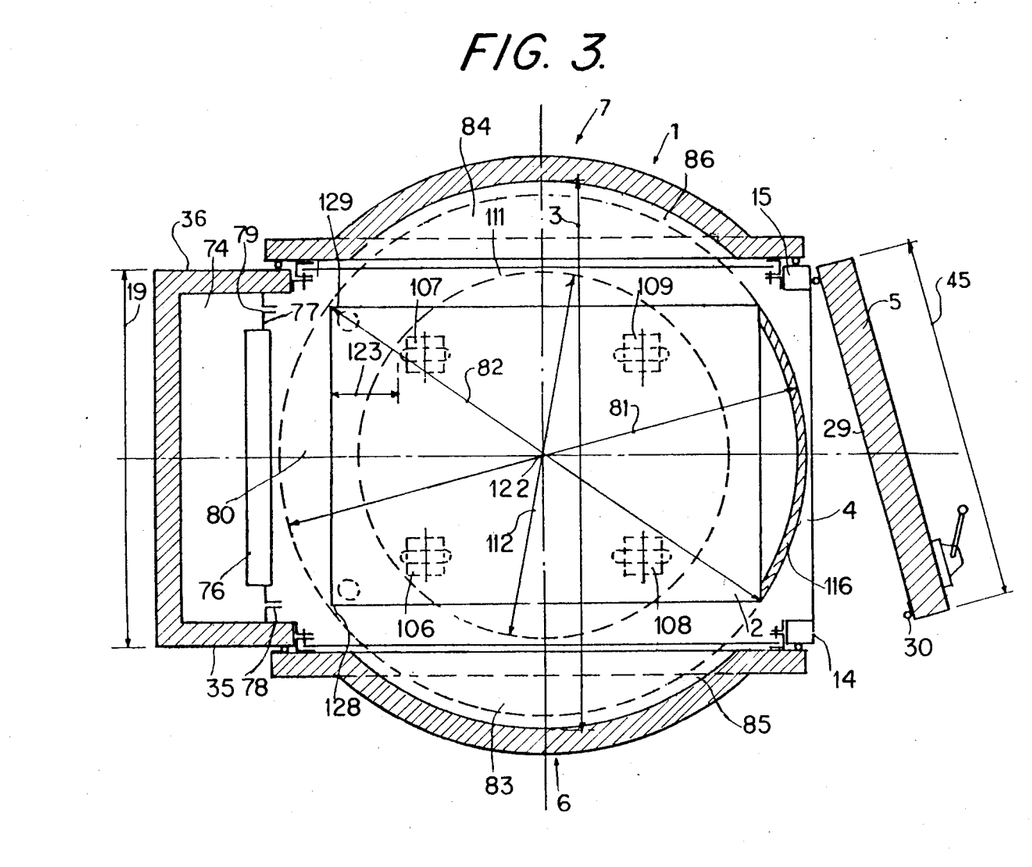
FIG. 3 is a plane and part-sectional view of the oven, the section being taken along the line III—III of FIG. 2.
Figure 4:
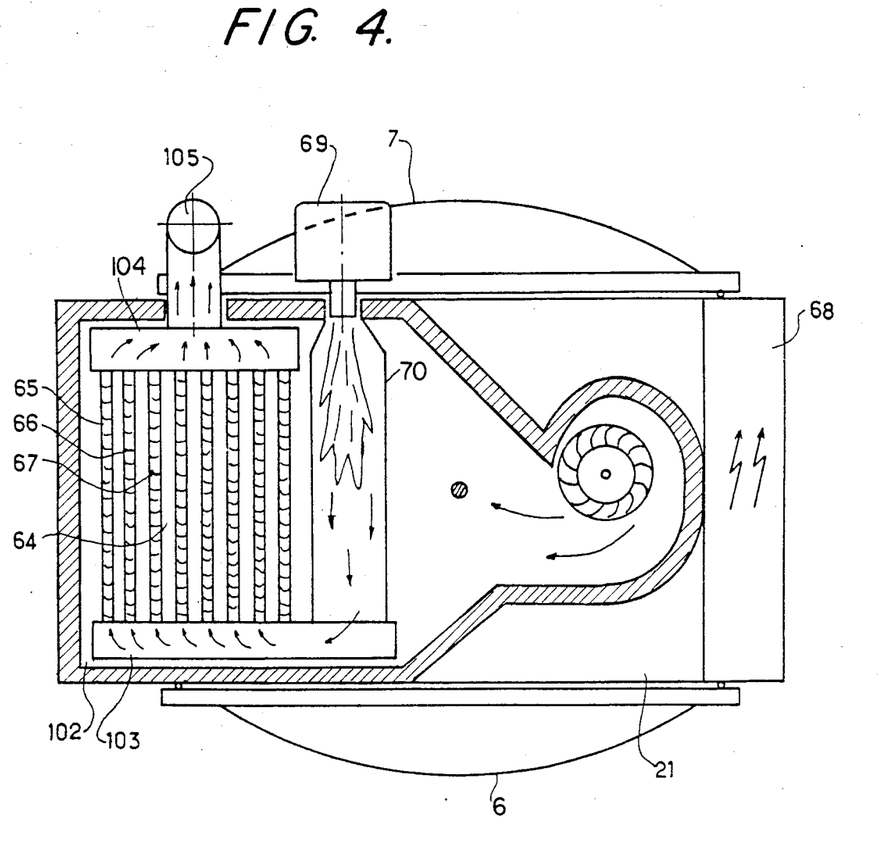
FIG. 4 is a plane and part-sectional view of the oven, the section being taken along the line IV—IV of FIG. 2.
Figure 5:
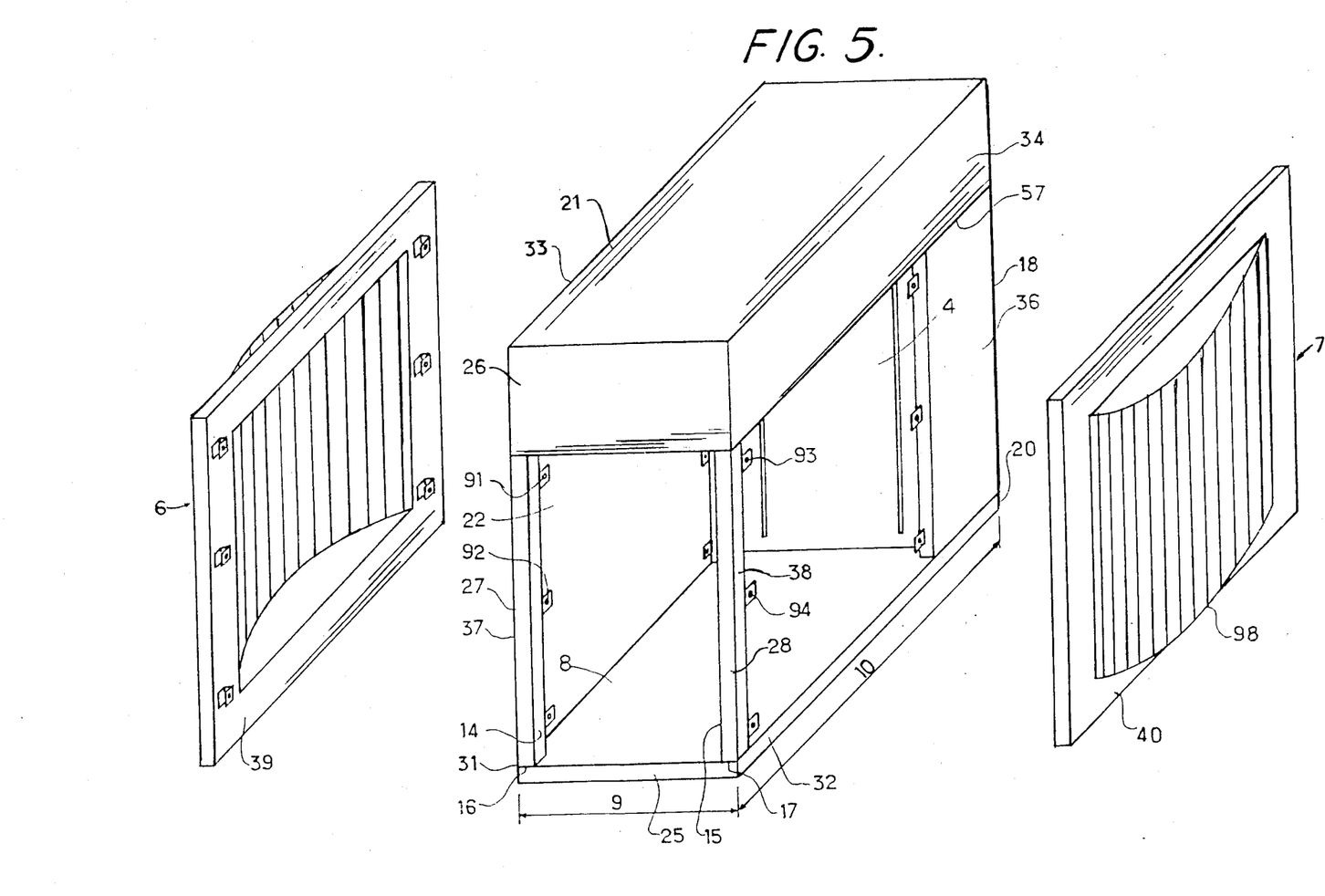
FIG. 5 is an exploded perspective view of the narrow central core and of the detachable lateral covers.

To enable the swivel truck 2 to step up the floor 8 of central core 4, and thus, during its charging movement, to clear the step consisting of the front face 25 (FIG. 5) of said floor 8, the rear face 113 of the swivel truck 2 is provided with a pair of bow-shaped members 114, 115, said rear face 113 facing the charging door 5. The upper members consists of a handle 114 disposed at a convenient level so as to be within easy reach of the operator's hands, the lower member 115 consisting of a bar disposed within easy reach of the operator's foot. The contours 116, 117 of said handles 114, 115 are preferably inscribed in the cylindrical volume 80 (FIG. 3).

As the operator or baker pushes the swivel truck 2 into the baking chamber 53 by means of the upper handle 114, the front casters 106, 107 abut the front face 25 of floor 8 of central core 4. Then the operator depresses the lower handle 155 with his foot, to tilt the swivel truck 2 towards him, so that the front casters 106, 107 will rise and thus be able to roll on the floor 8 of central core 4. The momentum thus impressed to the swivel truck 2 will cause the rear casters 108, 109 to continue this forward movement. The roller 118, rigidly secured to the top 119 of swivel truck 2, rises on the guide ramp 120 of hook 54 and eventually drops onto the retaining groove 121 of this hook. Thus, the swivel truck 2 is properly positioned and suspended in the oven, the casters 106, 107, 108 and 109 being slightly spaced from floor 8.

Due to the relatively short distance between the casters 106–109 and the central axis 122 of swivel truck 2, there is a certain distance 123 (FIG. 3) between the front casters 106, 107 and the front edge 124 of swivel truck 2. Now, when at the end of the baking process the baker pulls the upper handle 114 with both hands, the swivel truck 2 is caused to tilt towards him. To release the roller 118 from the retaining groove 121 of hook 54 the operator must necessarily be able to cause the front edge 124 of swivel truck 2 to rest momentarily on a bearing. For this purpose, the upper face 11 of floor 8 is provided with a pair of fixed blocks 126, 127 engageable by the front end 124 of swivel truck 2 when the truck 22 is being released from the groove 121 of hook 54. These blocks 126, 127 are disposed just beneath the pair of front corners 128, 129 of the rectangular base 90 of swivel truck 2, a slight clearance 130 being provided between this base 90 and the top faces 131, 132 of blocks 126, 127.

I claim:

1. A swivel-truck bakery oven for baking breads, pastries and the like, said oven being adapted to receive a swivel-truck, said swivel truck bakery oven comprising:
   (a) a baking chamber closeable by a charging door of a predetermined door width;
   (b) an electric control box;
   (c) a re-circulation channel comprising a re-circulation fan and means for heating air received from said baking chamber;
   (d) means for rotating a swivel-truck about a vertical axis, said swivel-truck having a rectangular base of a predetermined width, and a predetermined diagonal length, said swivel-truck being positioned inside said swivel-truck bakery oven, wherein rotation of said swivel-truck defines a cylindrical volume having a predetermined diameter;
   (e) a blowing manifold comprising vertical louvres and a steam generator;
   (f) a frame structure having a width corresponding to said diameter, said frame having a rectangular parallelipipedic central core having a width substantially corresponding to said door width; and
   (g) two lateral covers detachably connected to said frame, opposed open sides of each of said lateral covers having a rectangular cavity of a depth slightly greater than half of the difference between said swivel-truck width and said diagonal, said lateral cover cavities comprising means for accommodating said swivel-truck when said swivel-truck rotates.

2. A swivel truck bakery oven in accordance with claim 1, wherein said central core comprises a bottom floor of rectangular configuration having a relatively long side and a relatively short side, wherein the length of said relatively short side corresponds to said door width.

3. A swivel-truck bakery oven in accordance with claim 2, wherein said swivel-truck is mounted on four rollable casters, wherein said casters inscribe a circle when said swivel truck is rotated about its vertical axis, said circle having a diameter slightly less than the relatively shorter side of said core floor.

4. A swivel-truck bakery oven in accordance with claim 2, wherein said bottom floor surface comprises a pair of fixed blocks positioned at two front corners of said rectangular base of said swivel-truck, wherein said blocks have a height sufficient to provide clearance between said top surface of each block and a bottom surface of said rectangular base of said swivel-truck.

5. A swivel-truck bakery oven in accordance with claim 2, wherein said core has a front end and a rear end, wherein said blowing manifold, said steam generator, and said vertical louvres are positioned at the rear end of said core area, wherein said oven includes means for injecting heated air through said louvres and into said baking chamber.

6. A swivel-truck bakery oven in accordance with claim 5, wherein said central core comprises a horizontal casing supported by a vertical body and by a pair of vertical supports positioned at said front end, said casing comprising said electric control box, said re-circulation channel, and said mechanical and power means for rotating said swivel-truck about said vertical axis.

7. A swivel-truck bakery oven in accordance with claim 6, wherein said central core comprises a front opening, said opening defined by a front end of said bottom floor surface, a front end of said horizontal casing, and outer surfaces of said vertical supports, wherein said front opening is adapted to be selectively closed by said charging door.

8. A swivel-truck bakery oven in accordance with claim 7, wherein said central core comprises two lateral rectangular apertures defined by a door casing comprising lateral side ends of said bottom floor surface, lateral walls of said horizontal housing, vertical walls of said vertical body, and said outer surfaces of said vertical supports, wherein each of said rectangular apertures is closed on one side by one of said detachable lateral covers is detachably secured by securing means accessible from the interior of said baking chamber.

9. A swivel-truck bakery oven in accordance with claim 6, wherein said means for heating air comprises:
   (a) a heat-exchanger;
   (b) a burner for non-solid fuels;
   (c) a main tube for conducting combustion gases over a substantially horizontal path;
   (d) a first manifold for receiving said combustion gases;
   (e) a plurality of additional gas conducting for conducting said combustion gases from said first manifold tubes; and
   (f) a second manifold from which said combustion gases are directed to a chimney exhaust.

10. A swivel truck bakery oven in accordance with claim 9, wherein said recirculation fan is adapted to suck in air from outside of said bakery oven through an intake port positioned in a lower wall of said horizontal casing, and to create an air stream for moving said intake air towards said heating means.

11. A swivel truck bakery oven in accordance with claim 10, wherein said burner, said fire tube, and said plurality of additional tubes extend substantially at a right angle with respect to said air stream.

12. A swivel-truck bakery oven in accordance with claim 1, wherein said baking chamber is defined by an inner wall of said door, by an inner wall of said frame, by inner surfaces of said detachable lateral covers, by an upper surface of said bottom floor, and by a lower surface of said frame.

13. A swivel-truck bakery oven in accordance with claim 1, wherein said cylindrical volume diameter is equal to the length of a diagonal taken across a horizontal rectangular surface area of said swivel-truck, and wherein said cylindrical volume comprises two cylindrical sectors extending from two sides of said central core which extend through said open frame sides.

14. A swivel truck bakery oven in accordance with claim 1, wherein each of said detachable lateral cover cavities comprises a bottom wall slightly lower than a rectangular base of a swivel truck positioned in said oven.

15. A swivel-truck bakery oven in accordance with claim 14, wherein each of said detachable lateral cover cavities is substantially parallelipipedic.

16. A swivel-truck bakery oven in accordance with claim 15, wherein each of said detachable lateral cover cavities has a generally arcuate cross-sectional cavity having a cylindrical sector configuration.

17. A swivel-truck bakery oven in accordance with claim 16, wherein each of said detachable lateral covers comprises a peripheral frame having an inner wall and an outer wal, wherein each inner frame wall comprises a peripheral ceiling gasket adapted to press against opposite side walls of said frame when each of said detachable lateral covers is affixed to said bakery oven.

18. A swivel-truck bakery oven in accordance with claim 17, wherein each of said detachable lateral covers comprises a substantially parallelipipedic cavity area having a top surface and a bottom surface, wherein said bottom surface is positioned above the ground on which said oven is located in order to create a ground clearance.

19. A swivel-truck bakery oven in accordance with claim 18, wherein said bottom surface of each of said detachable lateral covers, when attached to said frame structure, is raised with respect to a bottom surface of said peripheral frame of each said cover.

20. A swivel-truck bakery oven in accordance with claim 1, wherein said swivel-truck has a front side and rear side, said rear side being adjacent to said charging door and comprising an upper curved handle positioned at a height on said swivel truck adapted to be grasped by hands of an operator, and a lower curved bar positioned at a predetemined distance below said upper handle and adapted to be placed into contact with a foot of an operator.

21. A swivel-truck bakery oven in accordance with claim 20, wherein said handles are positioned within said cylindrical volume.

* * * * *